US009668406B2

(12) United States Patent
Dybro

(10) Patent No.: US 9,668,406 B2
(45) Date of Patent: Jun. 6, 2017

(54) SECTIONAL YIELD MEASUREMENT ON ROW INDEPENDENT HARVESTING HEAD

(71) Applicant: Deere & Company, Moline, IL (US)

(72) Inventor: Niels Dybro, Sherrard, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/717,373

(22) Filed: May 20, 2015

(65) Prior Publication Data

US 2016/0338263 A1 Nov. 24, 2016

(51) Int. Cl.
| | |
|---|---|
| *A01D 41/14* | (2006.01) |
| *G01G 11/04* | (2006.01) |
| *A01D 34/00* | (2006.01) |
| *A01D 57/20* | (2006.01) |
| *A01D 34/14* | (2006.01) |
| *G01G 11/00* | (2006.01) |
| *A01D 41/127* | (2006.01) |
| *A01D 101/00* | (2006.01) |

(52) U.S. Cl.
CPC ........... *A01D 34/008* (2013.01); *A01D 34/14* (2013.01); *A01D 41/127* (2013.01); *A01D 41/1271* (2013.01); *A01D 41/141* (2013.01); *A01D 57/20* (2013.01); *G01G 11/003* (2013.01); *A01D 2101/00* (2013.01)

(58) Field of Classification Search
CPC .............. A01D 41/127; A01D 41/1271; A01D 41/1272; G01G 11/003; G01G 11/00; G01G 11/043
See application file for complete search history.

(56) References Cited

U.S. PATENT DOCUMENTS

| | | | | |
|---|---|---|---|---|
| 3,924,729 | A * | 12/1975 | Flinth | G01G 11/003 177/16 |
| 6,213,870 | B1 | 4/2001 | Satzler | |
| 8,286,788 | B2 * | 10/2012 | Massotte | D06B 17/00 198/806 |
| 8,495,855 | B1 * | 7/2013 | Conrad | A01D 61/002 56/16.4 R |
| 9,074,923 | B2 * | 7/2015 | Hyer | G01G 11/00 |
| 9,320,196 | B2 * | 4/2016 | Dybro | A01D 45/021 |
| 9,410,840 | B2 * | 8/2016 | Acheson | G01G 11/003 |

(Continued)

FOREIGN PATENT DOCUMENTS

| | | |
|---|---|---|
| EP | 2382854 A1 | 11/2011 |
| EP | 2774472 A2 | 9/2014 |

OTHER PUBLICATIONS

European Search Report in foreign counterpart application No. 16169897.2 dated Aug. 10, 2016 (7 pages).

*Primary Examiner* — John G Weiss

(57) ABSTRACT

A system for sectional yield measurement includes a draper frame (106); a reciprocating knife (112) fixed to a forward edge of the draper frame (106); rollers (122, 126) spaced apart from one another across the width of the draper frame (106); a first endless belt (120, 124) supported on the plurality of rollers (122, 126); load sensors (300) disposed to sense a cut crop load applied to the plurality of rollers (122, 126); and an ECU (204) coupled to the load sensors to calculate a sectional yield of the row independent harvesting head (102) based at least upon signals indicative of the cut crop load.

18 Claims, 3 Drawing Sheets

(56) References Cited

U.S. PATENT DOCUMENTS

| 2006/0015253 | A1* | 1/2006 | Ochs ................ G06F 19/3425 |
|---|---|---|---|
| | | | 702/1 |
| 2008/0078155 | A1 | 4/2008 | Coers et al. |
| 2014/0230580 | A1 | 8/2014 | Dybro et al. |
| 2016/0084987 | A1* | 3/2016 | Dybro ................ G01V 99/00 |
| | | | 702/5 |

* cited by examiner

SECTIONAL YIELD MEASUREMENT ON ROW INDEPENDENT HARVESTING HEAD

FIELD OF THE INVENTION

The invention relates to assessing the crop yield of a row independent harvesting head. More particularly, it relates to assessing the sectional yield of a row independent harvesting head.

BACKGROUND OF THE INVENTION

Agricultural harvesting heads for harvesting non-row crops (i.e. row independent crops) such as wheat, oats, and other similar grass plants go back to the $19^{th}$ century.

These harvesting heads typically comprise a reciprocating knife that extends across the width of the harvesting head.

In one arrangement, often called a "draper head" or just a "draper", the crop material, once severed from the ground by the reciprocating knife, falls rearward onto endless belt conveyors. These conveyors, move laterally inward from both ends towards a central region of the agricultural harvesting head, whereupon the cut crop material is deposited on a central conveyor that carries the crop material rearward and into a feederhouse on the agricultural combine that supports the agricultural harvesting head.

In recent years, it has become increasingly important to determine with greater resolution the performance of crops in order to cultivate the soil more carefully, apply chemicals more sparingly, and increase yields.

In the past, the yield of a draper head was determined by measuring the quantity of clean grain leaving the cleaning shoe of the agricultural combine and carried upward into the grain tank (i.e. the storage tank).

Unfortunately, since this arrangement measures the crop yield as the crop (grain in this case) leaves the cleaning shoe of the combine harvester, it inherently averages the yield across the entire width of the draper head.

What is needed is a system for measuring the crop yield of a draper head that indicates the crop yield in several sections across the width of the draper head.

It is an object of this invention to provide such a system.

SUMMARY OF THE INVENTION

In accordance with one aspect of the invention, a system for sectional yield measurement across a width of a row independent harvesting head, comprising: a draper frame that extends laterally and generally perpendicular to a direction of travel "V"; a reciprocating knife fixed to a forward edge of the draper frame and extending substantially the entire width of the draper frame; a plurality of rollers spaced apart from one another across the width of the draper frame, wherein the plurality of rollers rotate about axes that extend generally parallel to the direction of travel "V"; a first endless belt supported on the plurality of rollers, wherein the plurality of rollers support the at least a first endless belt, and wherein the first endless belt is disposed behind the reciprocating knife to receive cut crop material severed by the reciprocating knife; load sensors disposed to sense a cut crop load applied to the plurality rollers and to generate signals indicative of the cut crop load; and an ECU coupled to the load sensors and configured to receive the signals indicative of the cut crop load and to calculate a sectional yield of the row independent harvesting head based at least upon the signals indicative of the cut crop load.

The ECU may be configured to determine a change in load between adjacent rollers.

The ECU may be configured to determine the change in load by calculating a difference between a first signal generated by a first load sensor and a second signal generated by a second load sensor.

At least one end of each of the plurality of rollers may be supported in a corresponding roller mount and the load sensors may be disposed to sense a load applied by the at least one end of each of the plurality rollers to the corresponding roller mount.

The corresponding roller mount may be fixed to a transverse frame member.

The first signal may indicate a cut crop load on a first roller of the plurality of rollers, and the second signal indicates a cut crop load on a second roller of the plurality rollers.

The first roller of the plurality of rollers and the second roller of the plurality of rollers may be disposed adjacent to each other with no rollers being disposed therebetween.

DETAILED DESCRIPTION

In the discussion herein, the term "electronic control unit" or "ECU" means one ECU, or a plurality of ECUs connected together in a network, wired and/or wireless.

Figure 1:
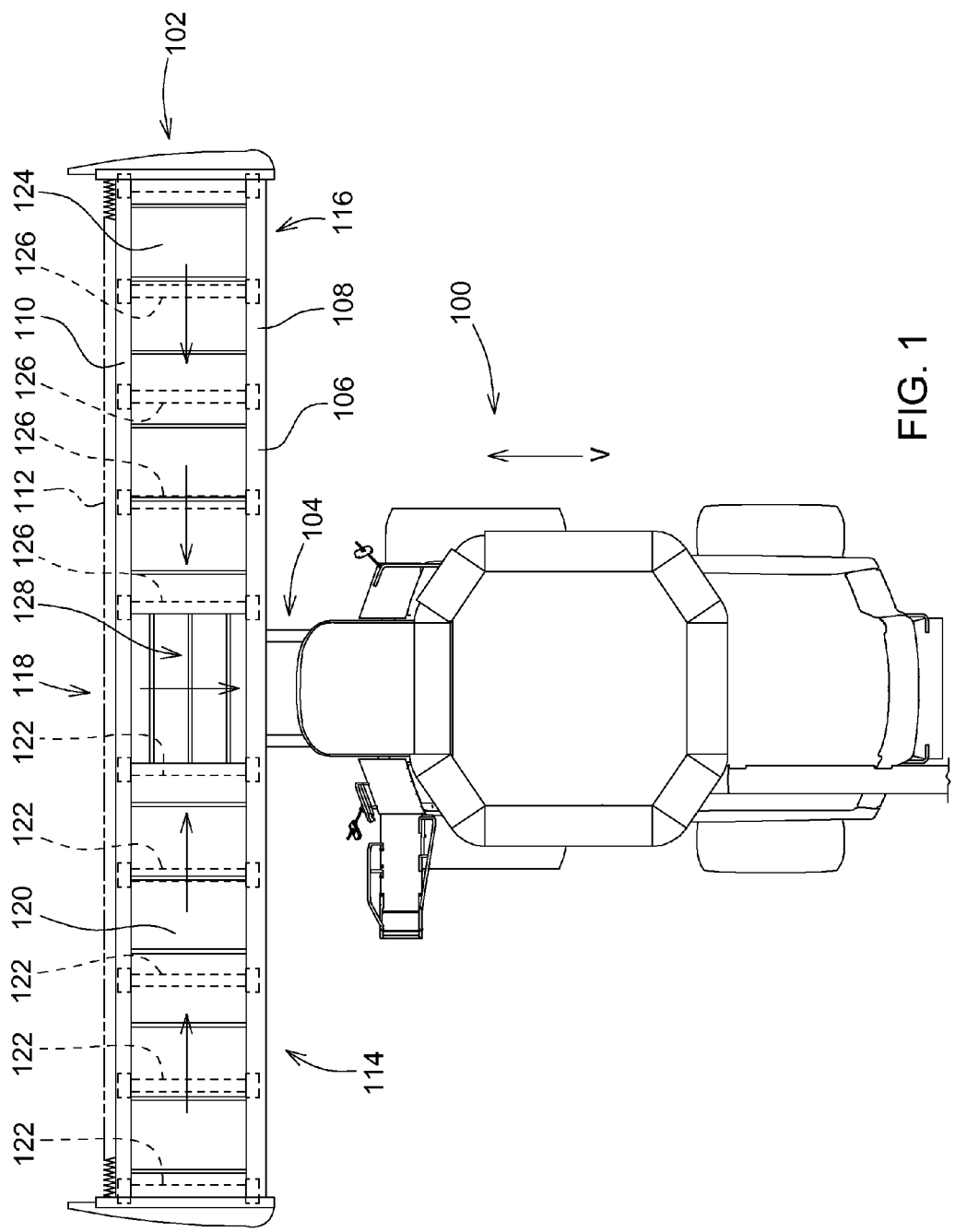
FIG. 1 is a plan view of a combine harvester and row independent harvesting head (here shown as a draper head) in accordance with the present invention.

Referring to FIG. 1, an agricultural harvester 100 (shown herein as a combine harvester) supports a row independent harvesting head 102 (shown herein as a draper head) on a feederhouse 104, wherein the feederhouse 104 is fixed to a forward end of the agricultural harvester 100 and extends forward therefrom.

The draper head 102 comprises a frame 106 that extends laterally and perpendicular to the direction of travel "V" of the agricultural harvester 100 as it travels through the field harvesting crop. The frame 106 includes a rear transverse frame member 108 and a forward transverse frame member 110. Each of these frame members extends substantially the entire width of the draper head 102.

The draper head 102 further comprises a reciprocating knife 112 that extends laterally and perpendicular to the direction of travel "V" and is fixed to a forward edge of the frame 106, in particular to forward transverse member 110. The reciprocating knife 112 extends substantially the entire width of the draper head 102.

The draper head 102 further comprises three endless belt conveyors, a left side endless belt conveyor 114, a right side endless belt conveyor 116, and a center endless belt conveyor 118.

The left side endless belt conveyor 114 comprises an endless belt 120 and five rollers 122 about which the endless belt 120 circulates. At least one of these rollers 122 is driven by a motor (not shown) to cause the upper surface of the endless belt 120 to travel inwardly toward a central region of the draper head 102. This is indicated by the arrow superimposed on the surface of the endless belt 120 in FIG. 1.

The right side endless belt conveyor 116 comprises an endless belt 124 and five rollers 126 about which the endless belt 124 circulates. At least one of the rollers 126 is driven by a motor (not shown) to cause the upper surface of the endless belt 124 to travel inwardly toward a central region of the draper head 102. This is indicated by the arrows superimposed on the surface of the endless belt 124 in FIG. 1.

The center endless belt conveyor 118 comprises an endless belt 128 that is supported on rollers (not shown) for circulating movement in a rearward direction, i.e. in a direction opposite to the direction of travel "V", and as indicated by the arrow superimposed on the endless belt 128 in FIG. 1.

Figure 2:
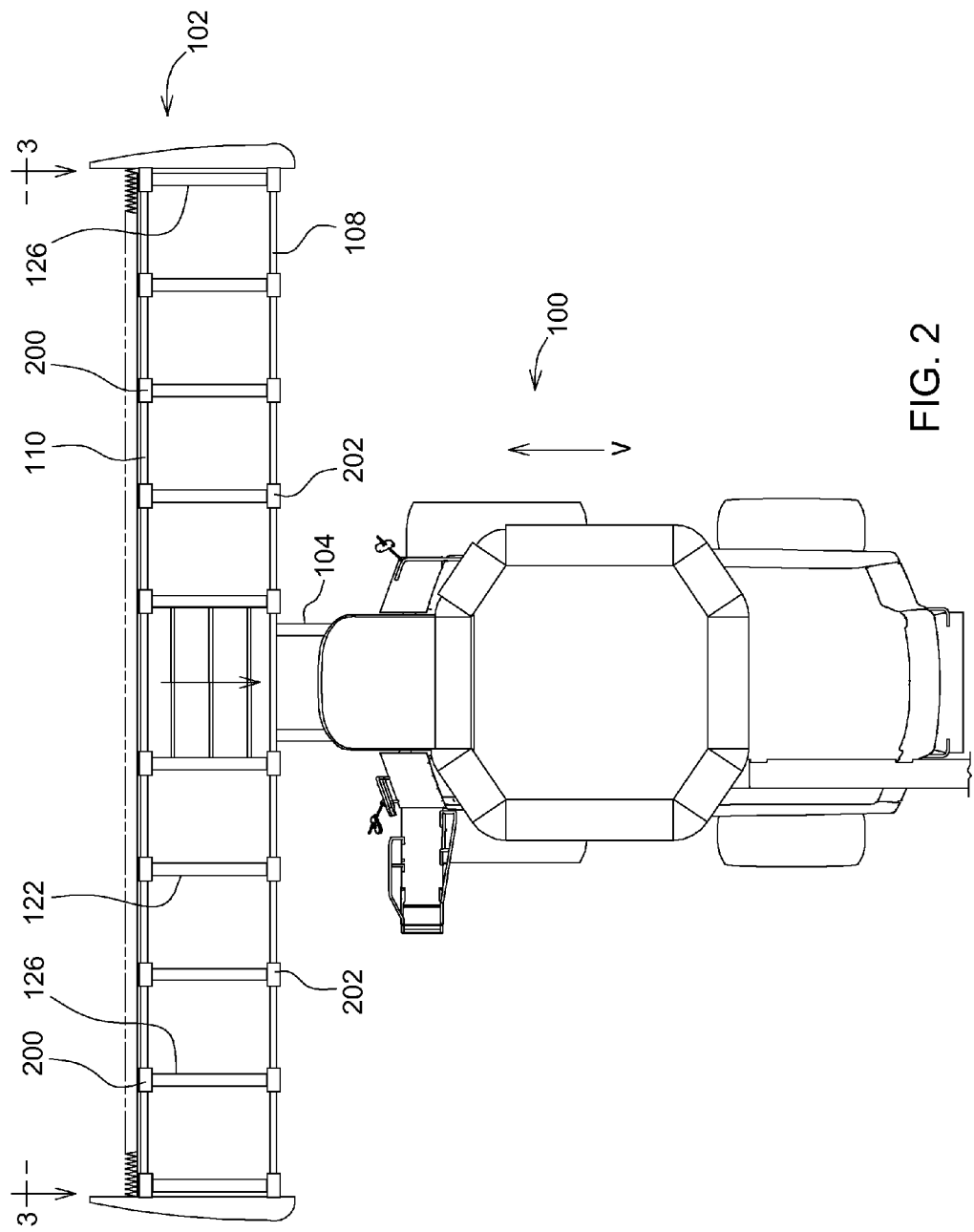
FIG. 2 is a plan view of the arrangement of FIG. 1 with left and right side endless conveyor belts removed.

In FIG. 2, the endless belts 120, 124 have been removed for clarity of illustration. Each of the rollers 122 and 126 are supported at their forward ends on a corresponding forward roller mount 200. Each of the rollers 122, 126 are supported at their rear ends on a corresponding rear roller mount 202. The forward roller mounts 200 are fixed to the forward transverse frame member 110. The rear roller mounts 202 are fixed to the rear transverse frame member 108.

Both the forward roller mounts 200 and the rear roller mounts 202 support the rollers 122, 126 to which they are coupled and permit the rollers 122, 126 to rotate with respect to the roller mounts 200, 202. Further, each of the ten forward roller mounts 200 comprises a built-in load sensor (FIG. 3) that generates a signal indicative of a vertical load placed upon each of the respective rollers 122, 126. By this arrangement, the weight of harvested crop on each of the rollers can be measured.

Figure 3:
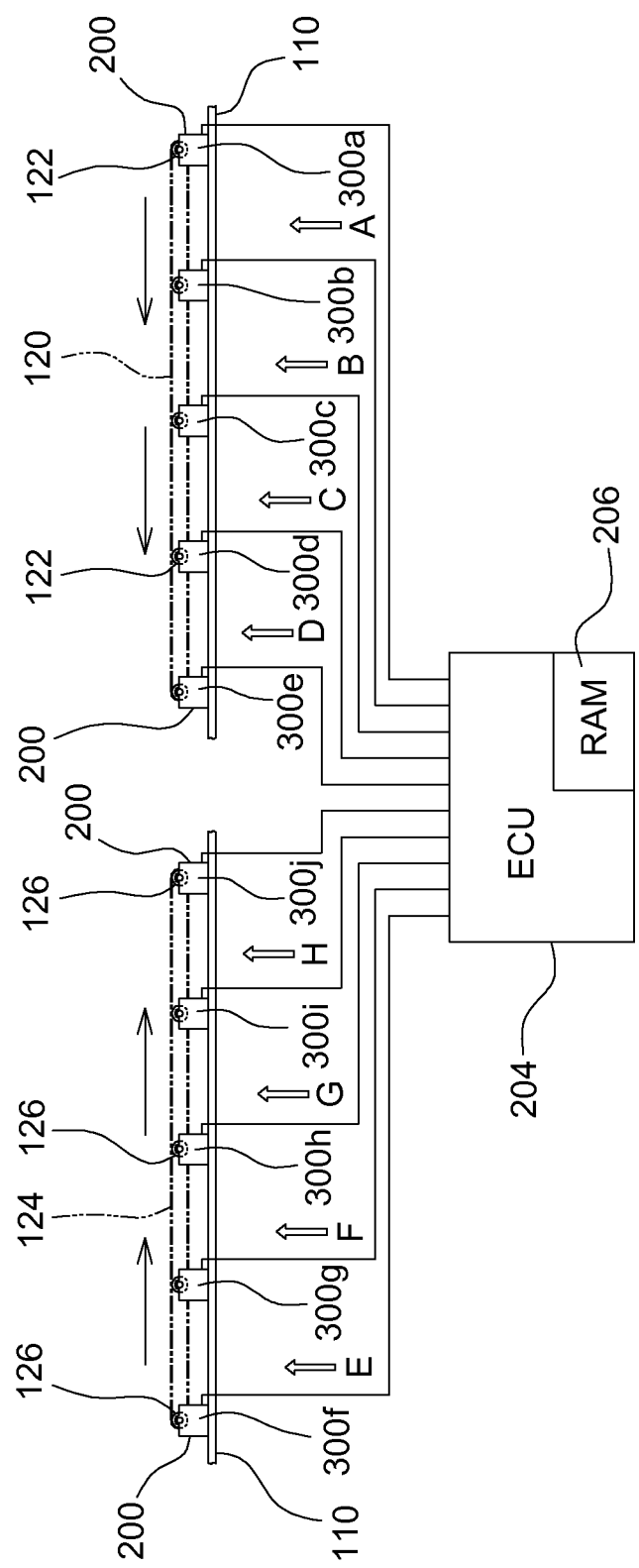
FIG. 3 is a schematic diagram of the system for sectional yield measurement of the system of FIGS. 1-2 combined with a fragmentary front view of the endless belt conveyors, rollers, and forward roller mounts taken at section line 3-3 in FIG. 2.

In FIG. 3, the front end of the left side endless belt conveyor 114 and the right side endless belt conveyor 116 is shown with the ten forward roller mounts 200 mounted upon the forward transverse frame member 110. The five rollers 122 support the endless belt 120 for recirculating movement about the rollers 122. The five rollers 126 support the endless belt 124 for recirculating movement about the rollers 126.

The load sensors 300 (shown individually as load sensors 300a-300j) integrated into the forward roller mounts 200 are coupled to an electronic control unit (ECU) 204 that is configured to receive and process signals from the load sensors. The ECU comprises a digital microprocessor and a memory circuit. The memory circuit contains digital instructions. The digital instructions are executed by the digital microprocessor. The digital instructions configure the digital microprocessor to perform all the operations described herein.

ECU 204 is configured to determine the crop yield in each of eight sections or zones (identified in FIG. 3 as zones A, B, C, D, E, F, G, and H) across substantially the entire width of the draper head 102. ECU 204 does this by determining the weight of cut crop material deposited on the endless belt 120 in the endless belt 124 in each of the eight zones.

Thus, rather than providing a single measure of crop yield across the entire width of the draper head 102 as in the prior art, the ECU 204 can determine the crop yield in each of eight zones. This breaks down the draper head 102 into eight separate zones of yield, and thus is an eightfold increase in crop yield resolution during harvesting.

For purposes of explanation, each of the ten load sensors 300 have been given individual designations.

The load sensor 300 on the left outermost front roller mount 200 is identified as load sensor 300a. The next innermost load sensor 300 is load sensor 300b. The next innermost load sensor 300 is load sensor 300c, the next innermost load sensor 300 is load sensor 300d, and the next innermost load sensor 300 is load sensor 300e.

The load sensor 300 on the right outermost front roller mount 200 is load sensor 300f. The next innermost load sensor 300 is load sensor 300g. The next innermost load sensor 300 is load sensor 300h. The next innermost load sensor 300 is load sensor 300i, and the next innermost load sensor 300 is load sensor 300j.

The ECU 204 is configured to periodically read the signals from all ten load sensors 300 and to store the signal levels of each of the ten load sensors in its random access memory (RAM) 206. This sampling is repeated at regular intervals during harvesting, on the order of every 100 ms.

The load signals from the ten load sensors indicate vertical loads equal to the weight of the conveyor belt (which is constant) plus the weight of the cut crop resting upon (and being carried by) the endless belts 120, 124. Crop is deposited upon the endless belts 120, 124 over substantially their entire width since the reciprocating knife extends over substantially the entire width of the draper head 102.

The amount of crop added to each of the eight zones A-H is therefore equal to the increase in weight of the crop in that section, which is equal to the increase in the vertical load indicated by any two adjacent load sensors. The ECU 204 is configured to determine the increase in vertical load in each section by subtracting the load signal generated by any load sensor 300 with the load signal generated by its next adjacent inner load sensor 300.

For example, the amount of crop added to zone A is generally proportional to the magnitude of the load signal provided by load sensor 300b minus the magnitude of the load signal provided by load sensor 300a. In a similar fashion, the amount of crop added to zone B is proportional to the signal of load sensor 300c minus the signal of load sensor 300b. The same pattern follows in identical fashion for every one of the eight zones A-H across the width of the draper head 102. Further, by measuring multiple loads along the length of a single endless belt 120, 124, the ECU 204 provides multiple zones and yield measurements for a single endless belt 120, 124. The left side endless belt conveyor 114 with its single endless belt 120 is subdivided into four zones A-D, and the right side endless belt conveyor 116 is subdivided into four zones E-H.

In this manner, the ECU 204 is able to measure crop yield for eight sections (zones), including four sections on each of the two endless belts 120, 124, to thereby increase eightfold the resolution of crop yield measurement in a transverse direction across the entire width of the draper head 102. The ECU 204 is similarly able to increase fourfold the resolution of crop yield measurement in a transverse direction on each of the two endless belts 120, 124. While the example herein shows a draper head divided into eight zones, any other number of zones could be provided by increasing or decreasing the number of rollers and load sensors.

The invention is defined by the claims, and not by the examples described above and illustrated in the Figures. The description and figures are provided simply to illustrate one possible arrangement of the invention. Other variations of the invention are contemplated. For example, the crop yield measurement in the example draper head 102 is provided in eight zones. By increasing or decreasing the number of rollers, the number of individual zones can be increased or decreased. Further, the load sensors are shown as a part of the forward roller mounts. They may instead be a part of the rear roller mounts. Further, both forward roller mounts and rear roller mounts may include load sensors. The ECU 204 is shown as a single ECU for convenience of illustration. It may be configured as multiple ECUs connected over a network, either wired or wireless, in which each ECU of the multiple ECUs performs a part of the functions described herein and still fall within the scope of the claims. Further, in the embodiment illustrated and described herein the header is divided into eight sections (or zones). A similar system within the scope of the claims could be provided with more or fewer zones.

The invention claimed is:

1. A system for sectional yield measurement across a width of a row independent harvesting head (102), comprising:
   a draper frame (106) that extends laterally and generally perpendicular to a direction of travel "V";
   a reciprocating knife (112) fixed to a forward edge of the draper frame (106) and extending substantially an entire width of the draper frame (106);
   a plurality of rollers (122, 126) spaced apart from one another across the width of the draper frame (106), wherein the plurality of rollers rotate about axes that extend generally parallel to the direction of travel "V";
   a first endless belt (120, 124) supported on the plurality of rollers (122, 126), wherein the plurality of rollers (122, 126) support the at least a first endless belt (120, 124), and wherein the first endless belt is disposed behind the reciprocating knife (112) to receive cut crop material severed by the reciprocating knife (112);
   load sensors (300) disposed to sense a cut crop load applied to the plurality of rollers (122, 126) and to generate signals indicative of the cut crop load;
   an ECU (204) coupled to the load sensors and configured to receive the signals indicative of the cut crop load and to calculate a sectional yield of the row independent harvesting head (102) based at least upon the signals indicative of the cut crop load; and wherein the ECU (204) is configured to determine a change in load between adjacent rollers.

2. The system for sectional yield measurement according to claim 1, wherein the ECU (204) is configured to determine the change in load by calculating a difference between a first signal generated by a first load sensor and a second signal generated by a second load sensor.

3. The system for sectional yield measurement according to claim 2, wherein the first signal indicates a cut crop load on a first roller of the plurality of rollers (122, 126), and wherein the second signal indicates a cut crop load on a second roller of the plurality of rollers (122, 126).

4. The system for sectional yield measurement according to claim 3, wherein the first roller of the plurality of rollers (122, 126) and the second roller of the plurality of rollers (122, 126) are disposed adjacent to each other with no rollers being disposed therebetween.

5. The system for sectional yield measurement according to claim 1, wherein at least one end of each of the plurality of rollers (122, 126) is supported in a corresponding roller mount (200, 202) and further wherein the load sensors (300) are disposed to sense a load applied by the at least one end of each of the plurality of rollers (122, 126) to the corresponding roller mount (200, 202).

6. The system for sectional yield measurement according to claim 5, wherein the corresponding roller mount (200, 202) is fixed to a transverse frame member (108, 110).

7. The system for sectional yield measurement according to claim 1, wherein the ECU (204) is configured to calculate a sectional yield for each of a plurality of sections of the first endless belt (120, 124).

8. The system for sectional yield management according to claim 7, wherein the system further comprises a second endless belt (120, 124) and wherein the ECU (204) is configured to calculate a sectional yield for each of a second plurality of sections of the second endless belt (120, 124).

9. An agricultural harvesting vehicle comprising an agricultural harvester and a system for sectional yield management according to claim 1 mounted on said agricultural harvester.

10. A system for sectional yield measurement across a width of a row independent harvesting head (102), comprising:
    a draper frame (106) that extends laterally and generally perpendicular to a direction of travel "V";
    a reciprocating knife (112) fixed to a forward edge of the draper frame (106) and extending substantially an entire width of the draper frame (106);
    a plurality of rollers (122, 126) spaced apart from one another across the width of the draper frame (106), wherein the plurality of rollers rotate about axes that extend generally parallel to the direction of travel "V";
    a first endless belt (120, 124) supported on the plurality of rollers (122, 126), wherein the plurality of rollers (122, 126) support the at least a first endless belt (120, 124), and wherein the first endless belt is disposed behind the reciprocating knife (112) to receive cut crop material severed by the reciprocating knife (112);
    load sensors (300) disposed to sense a cut crop load applied to the plurality of rollers (122, 126) and to generate signals indicative of the cut crop load; and
    an ECU (204) coupled to the load sensors and configured to receive the signals indicative of the cut crop load and to calculate a sectional yield of the row independent harvesting head (102) based at least upon the signals indicative of the cut crop load; and
    wherein the ECU (204) is configured to determine a change in load on the first endless belt (120, 124) due to addition of material deposited on the first endless belt (120, 124) between a first roller (122, 126) and a second roller (122, 126) of the plurality of rollers (122, 126).

11. The system for sectional yield measurement according to claim 10, wherein the ECU (204) is configured to determine the change in load by calculating a difference between a first signal generated by a first load sensor and a second signal generated by a second load sensor.

12. The system for sectional yield measurement according to claim 11, wherein the first signal indicates a cut crop load on a first roller of the plurality of rollers (122, 126), and wherein the second signal indicates a cut crop load on a second roller of the plurality of rollers (122, 126).

13. The system for sectional yield measurement according to claim 12, wherein the first roller of the plurality of rollers (122, 126) and the second roller of the plurality of rollers (122, 126) are disposed adjacent to each other with no rollers being disposed therebetween.

14. The system for sectional yield measurement according to claim 10, wherein at least one end of each of the plurality of rollers (122, 126) is supported in a corresponding roller mount (200, 202) and further wherein the load sensors (300) are disposed to sense a load applied by the at least one end of each of the plurality of rollers (122, 126) to the corresponding roller mount (200, 202).

15. The system for sectional yield measurement according to claim 14, wherein the corresponding roller mount (200, 202) is fixed to a transverse frame member (108, 110).

16. The system for sectional yield measurement according to claim 10, wherein the ECU (204) is configured to calculate a sectional yield for each of a plurality of sections of the first endless belt (120, 124).

17. The system for sectional yield management according to claim 16, wherein the system further comprises a second endless belt (120, 124) and wherein the ECU (204) is configured to calculate a sectional yield for each of a second plurality of sections of the second endless belt (120, 124).

18. An agricultural harvesting vehicle comprising an agricultural harvester and a system for sectional yield management according to claim 10 mounted on said agricultural harvester.

\* \* \* \* \*